March 19, 1963 — W. H. DE LANCEY — 3,082,335
CLUTCH MOTOR

Filed June 13, 1960 — 2 Sheets-Sheet 1

INVENTOR.
WARREN H. DELANCEY
BY
Robert A. Sloman
ATTORNEY

March 19, 1963 — W. H. DE LANCEY — 3,082,335
CLUTCH MOTOR
Filed June 13, 1960 — 2 Sheets-Sheet 2

INVENTOR.
WARREN H. DELANCEY
BY
Robert A. Sloman
ATTORNEY

United States Patent Office 3,082,335
Patented Mar. 19, 1963

3,082,335
CLUTCH MOTOR
Warren H. De Lancey, Zanesville, Ohio, assignor to Hardel Laboratories, Zanesville, Ohio, a copartnership
Filed June 13, 1960, Ser. No. 35,620
15 Claims. (Cl. 310—78)

This invention relates to an electric motor, and more particularly to a clutch type of motor for controlling the axial concentric drive and driven shafts therefor.

The present clutch motor has many uses and is particularly adapted for use in conjunction with an oil burner, for example wherein the motor driven outer or hollow shaft is adapted for connection to a blower for the oil burner and wherein the clutch driven internal shaft is adapted for connection to a drive-shaft of a fuel pump. It is contemplated, however, that there may be many other usages for the present clutch motor and that the said above mentioned blower and fuel pump drive, above described, is by way of illustration of one preferred embodiment of the present invention.

Heretofore, there have been found many situations where an electric motor or other motor may effectively drive a pair of concentrically arranged shafts, wherein the shafts rotate independently of each other and wherein one shaft is adapted to drive one mechanism and the other shaft is adapted to drive a second mechanism, independently of the first mechanism. Particularly in the oil burner field, this type of motor is adaptable wherein the motor driven outer shaft drives a blower and provision is made for an independent drive of the fuel pump for the oil burner.

In this particular field, there is an advantage in having the blower start causing a flow of air before the oil pump begins to pump. Alternately, on deactivation of the pump, it is furthermore desirable that there continue to be a flow of air for a limited period.

It is a primary object of the present invention to provide a novel form of clutch type motor wherein a clutch relationship is established between the outer and inner shafts of the motor and wherein the rotor of the motor drives the outer shaft connected with the blower, as in an oil burner, and wherein a clutch arrangement is established which, after the outer shaft has achieved a certain speed will become operative to establish a drive relation between the outer shaft and the said inner shaft, and accordingly there will be a time lag between the initiation of the drive of the inner shaft. Conversely, upon deenergization of the electric motor, the outer shaft will begin to slow being directly driven by the motor and the clutch will automatically disengage itself from the driven shaft, thus disconnecting the drive from the oil burner motor in permitting it to stop.

On the other hand, however, with the outer shaft disconnected from the driven shaft there is a reduced load upon the said outer shaft, and even though deenergized, its momentum will continue its rotation for a limited period with the result that the blower will continue to be effective after the fuel pump has been deenergized.

It is therefore a primary object of the present invention to provide in an electric motor, or other type of motor, a clutch mechanism whereby, after the initial rotary drive of one of the output shafts of the motor, the clutch will become effective through the action of centrifugal force in order to energize the second concentrically arranged output shaft of the motor. Accordingly the centrifugal force developed will maintain the drive in unison between the respective shafts until such time as the motor is deenergized, at which time the reduced speed of the rotor causes a reduction in the centrifugal force, such as will disengage the clutch mechanism from its connections with the driven shaft, causing the same to stop sooner than the motor driven shaft due to the drag on the driven shaft by the mechanism it was driving.

It is a further object of the present invention to thus provide in a motor as described, a novel form of clutch mechanism which takes advantage of the centrifugal force in its operation.

These and other objects will be seen from the following specification and claims in conjunction with the appended drawings in which:

It will be understood that the above drawings illustrate merely a preferred embodiment of the invention and that other embodiments are contemplated within the scope of the claims hereafter set forth.

Figure 1:
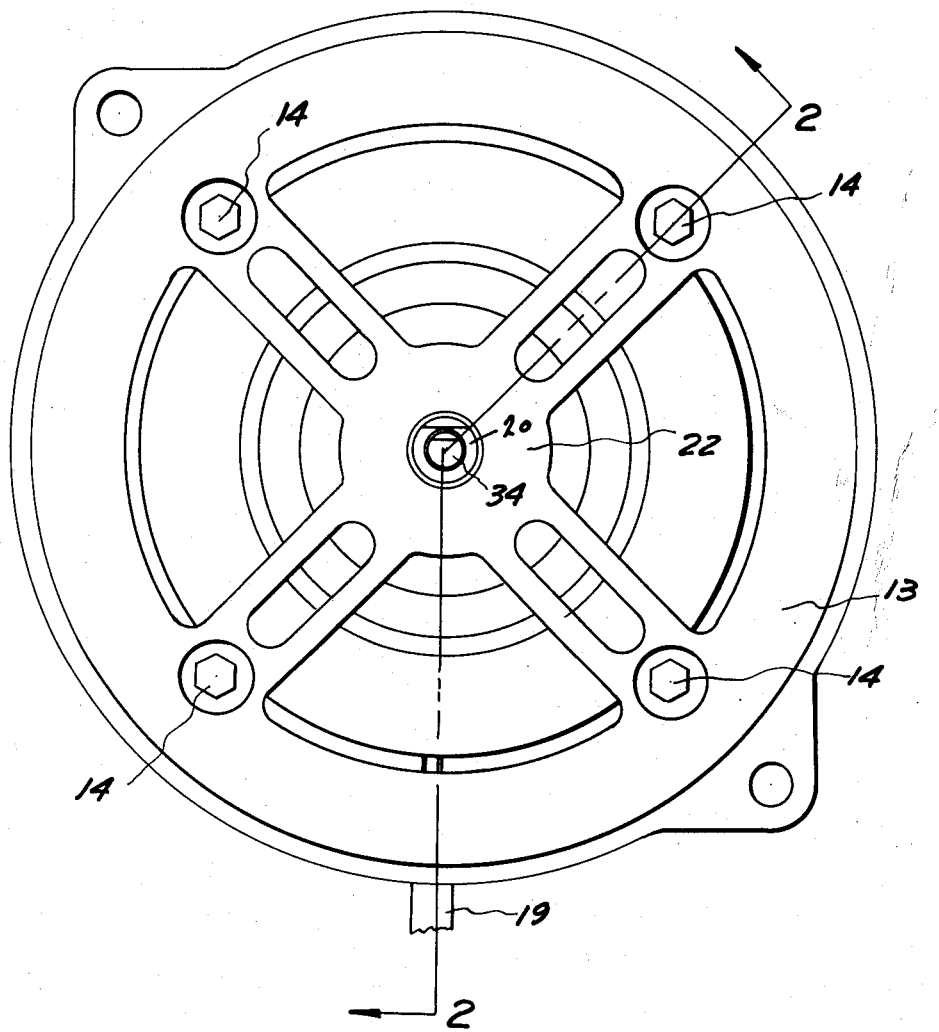
FIG. 1 is an end elevational view of the present clutch motor showing its mounting flange.
Figure 2:
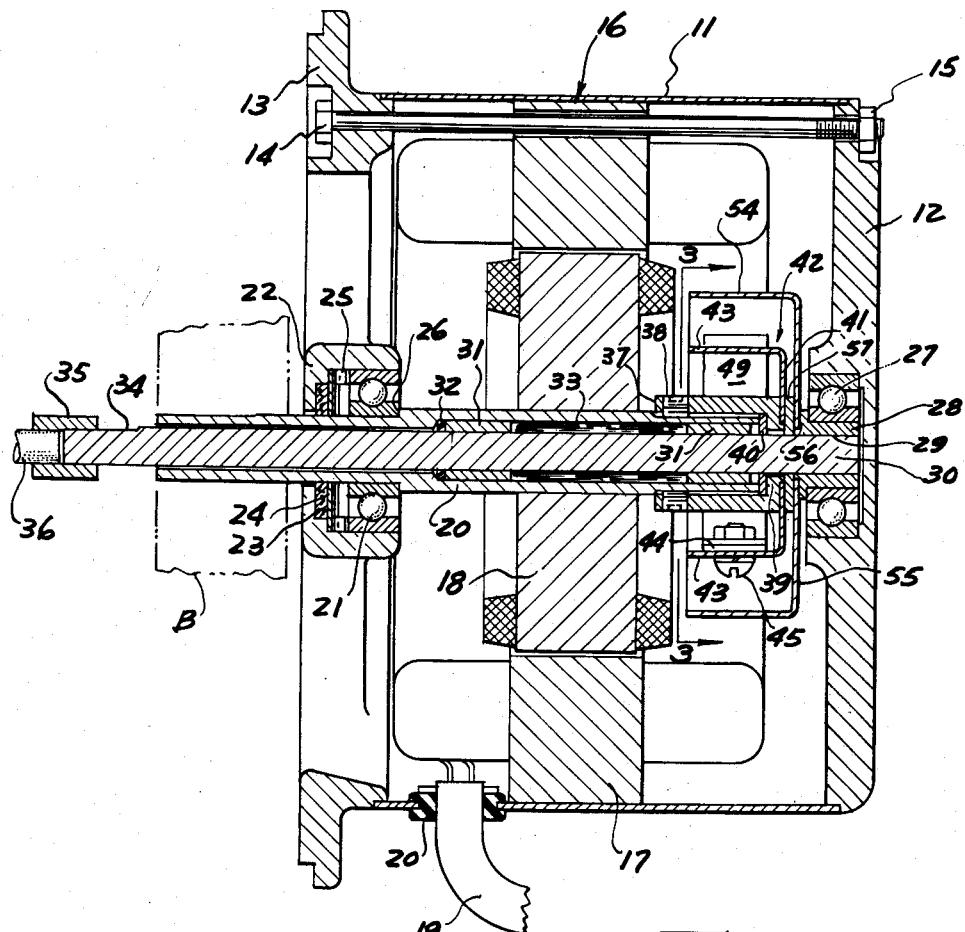
FIG. 2 is a section taken on line 2—2 of FIG. 1, illustrating the complete motor construction.

Referring to the drawings, and particularly FIG. 2, the present clutch motor includes a cylindrical, preferably metallic shell 11, which has secured over one end, the cover 12 and over its opposite end the mounting flange 13 employing a series of elongated bolts 14 and accompanying nuts 15. The present motor being electrical motor, for illustration, generally indicated at 16 is provisioned within the said shell and includes a conventional type of stator 17 with the usual field windings and including concentrically therein the rotor 18, which is suitably splined or otherwise secured upon the elongated driveshaft or tube 20, which projects through the mounting flange 13, as will hereafter be described.

Electric cable 19, of a conventional form extends through the grommet 20 of an insulated character within the shell 11 and is suitably connected to the stator windings, the present motor, for illustration, being an induction type of motor. It is understood, however, that any other suitable type of motor may be employed to carry out the principle of the present invention.

The motor driven outer shaft 20 extends through the ball bearing assembly 21 with the shoulder 26 of outer shaft 20 operatively engaging the same. The bearing assembly is snugly nested and retained within the hub 22 forming the central part of the mounting flange 13. A suitable felt seal 23 surrounds the shaft 20 and is retained within hub 22 by the washers 24 and the spring 25, which is interposed between the said washers and the bearing assembly 21.

Ball bearing assembly 27 is centrally nested within motor cover 12 within the apertured hub portion thereof and is centrally engaged by the bushing 28 which is fixed as at 29 upon the central shaft 30 which extends concentrically through the outer shaft 20 with longitudinally spaced bearings 31 interposed therebetween, and including the annular Teflon oil seal 32 adjacent front bearing 31. The space between the bearings 31 is normally filled with a suitable lubricant 33, such as grease, for illustration.

Shaft 30 projects through the outer end of the outer shaft 20 as at 34, and by means of a suitable coupling 35 is connected to a driven shaft 36, which in the preferred embodiment happens to be a driveshaft of a fuel pump for an oil burner, for illustration.

*Clutch Mechanism Between Drive and Driven Shafts*

Mounted over the inner end of the outer shaft 20 is an elongated bushing 37 which forms a part of the clutch assembly 42 and which is fixedly secured to the said outer shaft by the opposed set screws 38. The opposite end of bushing 37 is flanged inwardly as at 39 and a suitable thrust bearing 40 is interposed between said flange 39 and the end of shaft 20.

Figure 3:
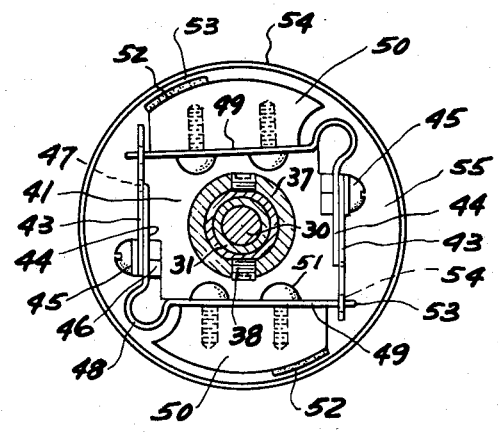
FIG. 3 is a fragmentary section taken on line 3—3 of FIG. 2, illustrating the clutch assembly.

The clutch assembly includes a bracket having a flat centrally apertured plate 41 which is fixedly secured to the said bushing 37, centrally thereof, and includes at its opposite ends the opposed right angular mounting plates 43, also shown in FIG. 3.

The mounting bracket for the clutch assembly then includes the base plate 41 and the parallel upstanding mounting plates 43. Mounted upon and along the interior surfaces of each of the said plates 43 are a pair of formed leaf-type springs 44 respectively secured thereto by the bolts 45 and nuts 46. Each spring, at its central portion extends beyond the one end of the plate 43 and is outwardly looped as at 48 and terminates in the elongated spring extension 49, normally arranged flexibly at right angle to the spring body 44.

A formed clutch weight or shoe 50 is mounted along and upon the outer edge of each of the said spring extensions 49 and fixedly secured thereto by the fasteners 51. The outer surface of each of the weights 50 is arcuate and is concentrically spaced inwardly from the annular clutch flange 54 of the clutch cup 55. Mounted upon the outer end portions of each of the weights 50 is an arcuate lining, preferably of cork 52, or other suitable material, normally spaced as at 53 of the interior wall of the cup flange 54, and adapted upon the application of centrifugal force on rotation of the said bracket 41 to swing outwardly for frictional cooperative driving engagement with the said cup-flange 54, as will be hereafter described.

The inner fixed ends of the leaf springs 44 are outturned as at 47 and project through an enlarged opening in the support plate 43. The opposite free end of the spring extension 49, as at 53 projects loosely through a transverse aperture 54 formed in the adjacent plate 43 forming a part of the bracket assembly 41—43, the said aperture 54 serving as a guide limiting flexing movements of the spring element 49 carrying the weight 50.

Referring to FIG. 2, the central portion of the flanged cup 55 is apertured and cooperatively receives and has secured thereto, as at 56, the bushing 28, which is in turn fixedly secured to the shaft 30 for rotation in unison. In other words, when the flanged cup 54—55 is rotatively driven by the clutch assembly, mounted upon the rotatable outer shaft 20, there will be effected through the bushing 28 a corresponding rotary movement of the shaft 30, which is concentrically arranged within the outer shaft 20.

It is noted also a suitable apertured thrust bearing 57 is interposed between base plate 41, secured to the outer shaft 20 and the base plate of the cup 55, as there will be at times relative motion between the two parts.

*Operation*

In operation with the motor 16, suitably energized, whether it be an electric motor, as shown, for illustration, or some other form of motor, a drive element, which in this case is the rotor 18, causes an initial rotation of the outer driveshaft 20 to which, in the preferred embodiment, a suitable blower B has been attached on the exterior of the casing. Initially and at the same time, the central shaft 30 is stationary, because, as viewed in FIG. 3 there is no fixed connection of said shaft with the outer shaft 20.

As the outer shaft 20 builds up speed, centrifugal forces are applied to the weights 50 on their resilient flexible mounting springs 49, 48, 44 with the result that the said shoes, or weights 50 move radially outward until their linings or cork attachments 52 begin to frictionally engage the flange 54 of the clutch cup 55. This establishes a driving relation and initiates a rotation in the same direction of the said cup which, through the bushing 28 is fixedly secured to the central shaft 30 arranged concentrically of the outer shaft 20.

This means that as the shaft 30 begins to rotate it causes a drive, in the present preferred embodiment of the shaft 36 connected with a fuel pump, for illustration.

Thereafter, and during further operation of the motor, at a maintained predetermined speed, both shafts will be rotated in unison and in the same direction. Now as the motor is deenergized automatically, or otherwise, the driving torque upon shaft 20 is ended and the shaft begins to slow down. At the point that the inherent resiliency of the springs 48, 49, overcomes the forces due to centrifugal force, the said weights 50, and their cork linings 52 will become disengaged from the flanged cup 55 removing the driving torque therefrom with the result that connected shaft 30 will immediately slow down and stop due to the drag thereon in its connection with the power takeoff which, in the present embodiment happens to be a fuel pump shaft.

At the moment, however, the said shaft 30, and connected cup 55 are disconnected from the bracket 41—43 and the load thereon resisting rotation is greatly reduced; and due to the inherent momentum of the rotating shaft 20 and connected rotor 18, the outer shaft 20 will continue to rotate for a limited period, with the result that after the shaft driving the fuel pump has actually stopped, the blower B connected with the shaft 20 will have continued to rotate in accordance with the objects of the present invention.

In the illustrative embodiment of the present invention, there is employed a low torque motor of the permanent split capacitor type, for illustration. The motor starts with a very small load, in view of the fact that only the blower B is connected to the rotor driven shaft 20. The starting winding has a capacitor in the line at all times in order to assure a quiet operation. Accordingly a low initial inrush current is guaranteed with the result that the motor has a much longer life and will not burn out.

Having described my invention, reference should now be had to the following claims.

I claim:

1. In a self-contained motor mechanism, including a casing and a principal driven element, a pair of rotatable shafts supported and journaled upon said casing and projecting therefrom for coupling to external loads respectively, one of said shafts directly connected to said principal driven element, and a clutch mechanism within the casing operatively engaged by said one shaft adapted for connection and disconnection with the other shaft so that it will only exert substantial torque at or near the normal operating speed.

2. In the motor mechanism of claim 1, said shafts being concentric, with one shaft inside and partially supported by the other.

3. In an electric motor, including a casing and an armature, a pair of shafts projecting from the casing for coupling to external loads respectively, one shaft directly connected to and starting and stopping with the motor armature, the other shaft concentric with the first shaft and journaled within the motor casing, and a clutch mechanism contained within said casing and connectable with said other shaft so that it will only exert substantial torque at or near, the normal operating speed of the motor.

4. A self-contained motor mechanism including a casing and an armature, a pair of concentric shafts projecting from one end of the casing, for coupling to external loads respectively, the outer shaft having less projection than the inner shaft and directly coupled to the motor armature, the inner shaft journaled within the outer shaft and in the motor casing, and a clutch mechanism operatively engaged by said outer shaft for coupling to said inner shaft so that it will only exert substantial torque at or near the normal operating speed of the motor.

5. A self-contained electric motor mechanism including a casing and an armature, a pair of concentric shafts projecting from one end of the casing, for coupling to external loads respectively, the outer shaft having less projection than the inner shaft and directly connected to the motor armature, the inner shaft journaled within the outer shaft and in the motor casing, and a clutch mechanism operatively engaged by said outer shaft for coupling to said inner shaft so that it will only exert substantial torque at or near a normal operating speed of the motor.

6. A self-contained motor mechanism including a casing and an armature, a pair of concentric shafts projecting from one end of the casing, for coupling to external loads respectively, the outer shaft having less projection than the inner shaft and directly coupled to the motor armature, the inner shaft journaled within the outer shaft and within the motor casing, and a centrifugal clutch mechanism operatively engaged by said outer shaft for coupling to said inner shaft so that it will only exert substantial torque at or near the normal operating speed of the motor.

7. A self-contained electric motor mechanism having a casing and an armature, a pair of concentric shafts projecting from one end of the casing, for coupling to external loads respectively, the outer shaft having less projection than the inner shaft and directly coupled to the motor armature, the inner shaft journaled within the outer shaft and within the motor casing, and a centrifugal clutch mechanism operatively engaged by said outer shaft for coupling to said inner shaft so that it will only exert substantial torque at or near the normal operating speed of the motor.

8. In an electric motor for oil burners, a self-contained structure, including a frame and an armature, a pair of concentric shafts for coupling respectively to a first load and a second load, a first shaft directly connected to and starting and stopping with the motor armature, a second shaft journaled within the first shaft and within the motor frame, and a clutch mechanism operatively interconnecting said shafts so that the said second shaft will only exert substantial torque at or near the normal operating speed of the motor.

9. In an electric motor for oil burners, a self-contained structure, including a frame and an armature, a pair of concentric shafts for coupling respectively to a first load and a second load, a first shaft directly connected to and starting and stopping with the motor armature, a second shaft journaled within the first shaft and within the motor frame, and a centrifugal clutch mechanism operatively interconnecting said shafts so that said second shaft will only exert substantial torque at or near the normal operating speed of the motor.

10. In a clutch motor, including a casing and a rotor; a hollow driveshaft projected through and secured to said rotor, journaled at one end within and projecting outwardly of the casing, a driven shaft concentrically disposed and journaled within said driveshaft and at both ends projecting therefrom, with one end of said driven shaft journaled upon said casing, a clutch cup centrally mounted on and secured to said driven shaft, a clutch bracket centrally secured to said driveshaft and positioned loosely within said clutch cup, a weighted shoe resiliently mounted on said bracket normally spaced from said cup, and adapted on rotation of said driveshaft to move radially outward under centrifugal force for frictional driving engagement with said cup initiating and maintaining rotation of said driveshaft.

11. In the clutch motor of claim 10, deenergization of said motor slowing down said rotor, with the reduced centrifugal force overcome by the resilient mounting of said shoe, disengaging said driven shaft from and in advance of stoppage of said driveshaft.

12. In a clutch motor, including a casing and a rotor; a hollow driveshaft projected through and secured to said rotor, journaled at one end within and projecting outwardly of the casing, a driven shaft concentrically disposed and journaled within said driveshaft and at both ends projecting therefrom, with one end of said driven shaft journaled upon said casing, a clutch cup centrally mounted on and secured to said driven shaft, a clutch bracket centrally secured to said driveshaft and positioned loosely within said clutch cup, a pair of spaced weighted shoes resiliently mounted on said bracket, normally spaced respectively from said cup and adapted on rotation of said driveshaft to move radially outward under centrifugal force for frictional driving engagement with said cup initiating and maintaining rotation of said driven shaft.

13. In the clutch motor of claim 10, the resilient mounting of the weighted shoe, including a right-angular leaf spring along one side fixedly secured to said bracket and with its right angular free end supportedly mounting said shoe, for free flexing movements radially of said shafts.

14. In a clutch motor, including a casing and a rotor, a hollow driveshaft projected through and secured to said rotor, a driven shaft concentrically disposed and journaled within said driveshaft and at both ends projecting therefrom, with one end of said driveshaft journaled upon said casing and with one end of said driven shaft journaled upon said casing, and a centrifugal clutch assembly including a drive bracket secured to said driveshaft, a clutch cup concentrically mounted over and spaced outwardly of said bracket and secured to said driven shaft, and a plurality of resiliently mounted weighted shoes on said bracket normally spaced from said cup and adapted on rotation of said driven shaft for movement radially outward and frictional driving engagement with said cup for initiating and maintaining rotation of said driveshaft.

15. In the clutch motor of claim 10, a first load concentrically mounted on and secured to said driveshaft, and a second load shaft fixedly connected with said driven shaft.

References Cited in the file of this patent

UNITED STATES PATENTS

| | | |
|---|---|---|
| 1,708,000 | Uggla et al. | Apr. 9, 1929 |
| 1,841,613 | Libby | Jan. 19, 1932 |
| 1,985,934 | Logan | Jan. 1, 1935 |